US011944100B1

(12) United States Patent
Zeppa

(10) Patent No.: US 11,944,100 B1
(45) Date of Patent: Apr. 2, 2024

(54) ANTIMICROBIAL, ANTIVIRAL OR BIOCIDE COATING COMPOSITIONS

(71) Applicant: SECOND CONTINENTAL IP, LLC, Sunrise, FL (US)

(72) Inventor: Andrew Zeppa, Watertown, CT (US)

(73) Assignee: SECOND CONTINENTAL IP, LLC, Sunrise, FL (US)

( * ) Notice: Subject to any disclaimer, the term of this patent is extended or adjusted under 35 U.S.C. 154(b) by 130 days.

(21) Appl. No.: 17/347,823

(22) Filed: Jun. 15, 2021

Related U.S. Application Data

(60) Provisional application No. 63/039,129, filed on Jun. 15, 2020.

(51) Int. Cl.
*A01N 55/00* (2006.01)
*A01N 31/08* (2006.01)
*A01N 43/66* (2006.01)
*A01P 1/00* (2006.01)

(52) U.S. Cl.
CPC ............. *A01N 55/00* (2013.01); *A01N 31/08* (2013.01); *A01N 43/66* (2013.01); *A01P 1/00* (2021.08)

(58) Field of Classification Search
None
See application file for complete search history.

(56) References Cited

U.S. PATENT DOCUMENTS

| | | | | |
|---|---|---|---|---|
| 4,282,366 A * | 8/1981 | Eudy | ...................... | C07F 7/1804 106/18.32 |
| 5,226,954 A * | 7/1993 | Suzuki | ...................... | C09K 3/18 106/287.16 |
| 5,954,869 A * | 9/1999 | Elfersy | .................. | C07F 7/1804 528/29 |
| 6,120,587 A * | 9/2000 | Elfersy | .................. | C07F 7/1804 106/287.16 |
| 6,291,397 B1 * | 9/2001 | Wilkins, Jr. | ........... | A01N 43/66 504/155 |
| 6,469,120 B1 * | 10/2002 | Elfersy | .................. | C07F 7/1804 528/29 |
| 8,999,363 B2 * | 4/2015 | Elfersy | .................. | A01N 33/12 514/642 |
| 10,174,239 B2 * | 1/2019 | Lee | ........................ | C09K 8/605 |
| 2020/0375190 A1 * | 12/2020 | Scheve | .................. | A01N 55/00 |

OTHER PUBLICATIONS

National Center for Biotechnology Information. "PubChem Compound Summary for CID 517121, Sodium dichloroisocyanurate" PubChem, https://pubchem.ncbi.nlm.nih.gov/compound/Sodium-dichloroisocyanurate. Accessed Mar. 23, 2023. Created Mar. 27, 2005. (Year: 2005).*

National Center for Biotechnology Information. "PubChem Compound Summary for CID 62827" PubChem, https:// pubchem.ncbi.nlm.nih.gov/compound/62827. Accessed Mar. 23, 2023. Created Jul. 19, 2005. (Year: 2005).*

National Center for Biotechnology Information. "PubChem Compound Summary for CID 44630158, Tetrasodium glutamate diacetate" PubChem, https://pubchem.ncbi.nlm.nih.gov/compound/Tetrasodium-glutamate-diacetate. Accessed Mar. 23, 2023. Created Mar. 2, 2010. (Year: 2010).*

\* cited by examiner

*Primary Examiner* — My-Chau T. Tran
(74) *Attorney, Agent, or Firm* — ZIEGLER IP LAW GROUP LLC

(57) ABSTRACT

The present disclosure relates to antimicrobial, antiviral or biocide coatings, coated objects and coating methods including a first component and a second component where the first component can provide persistent antimicrobial, antiviral or biocide kill (e.g. physically ruptures the cell membrane of the microorganism to kill upon contact).

2 Claims, 4 Drawing Sheets

FIG. 1A

| Composition | 1st Component | 2nd Component | 2nd Component Function |
|---|---|---|---|
| Antimicrobial Mixture | Organosilane quaternary ammonium compound (e.g., 3-(trihydroxysilyl)propyldimethyloctadecyl ammonium chloride) | Tetrasodium Glutamate Diacetate (Preferred) | chelating agent |
| | | Tetrasodium EDTA | chelating agent |
| | | Polyethyloxazoline | binder |
| | | Sodium Metasilicate | Corrosion inhibitor |
| | | Butoxydiglycol | Stain dissolver |
| | | NaDCC / SDIC, Sodium dichloro-s-triazinetrione (Dichlor) | antimicrobial |
| | | Thymol | antimicrobial |
| | | Sodium bicarbonate | antimicrobial |
| | | Sodium carbonate | antimicrobial |
| | | Adipic Acid | antimicrobial |
| | | Alkyl dimethyl benzyl ammonium chloride | antimicrobial |
| | | Alkyl dimethyl ethylbenzyl ammonium chloride | antimicrobial |
| | | Didecyldimethylammonium chloride | antimicrobial |
| | | Dioctyldimethylammonium chloride | antimicrobial |
| | | Quaternium-24 | antimicrobial |

Table 1A

FIG. 1B

| Composition | 1st Component | 2nd Component | 2nd Component Function |
|---|---|---|---|
| Antimicrobial Mixture | Organosilane quaternary ammonium compound (e.g., 3-(trihydroxysilyl)propyl dimethyl octadecyl ammonium chloride) | 3-glycidoxypropylmethyldiethoxysilane | binder/crosslinker/adheasion |
| | | Organofunctional silanes (not quaternary), for example Silquest Wetlink | |
| | | n-octyltrimethoxysilane | binder/crosslinker/adheasion |
| | | bis(triethoxysilyl)ethane | binder/crosslinker/adheasion |
| | | hexadecyl trimethoxysilane | binder/crosslinker/adheasion |
| | | Thymol | antimicrobial |
| | | Polyethyloxazoline | binder (non toxic) |
| | | Poly(2-ethyl-2-oxazoline) like | binder (non toxic) |
| | | Tetrasodium Glutamate Diacetate | chelating agent |
| | | Alkylated melamine resin | Resin |
| | | Polycarbamide (Evonik iC-186) | Resin |
| | | Polyvinylidene fluoride or | Resin |
| | | Polysilazanes | Resin |

Table 1B

FIG. 2A

| Composition | 1st Component | 2nd Component | 2nd Component Function | Additional Applications |
|---|---|---|---|---|
| Persistant Antimicrobial Mixture | Organosilane quaternary ammonium compound (e.g., 3- | Tetrasodium Glutamate Diacetate (Preferred) | chelating agent | Persistent disinfection fogging |
| | | Tetrasodium EDTA | chelating agent | AM Bandages (for livestock or humans), |
| | | Polyethyloxazoline | binder | HVAC filter and Mask Treatment |
| | | Sodium Metasilicate | Corrosion inhibitor | 24 hour easy spray disinfectant (use TSA |
| | | Butoxydiglycol | Stain dissolver | Ware (silverware, plates) |
| | | NaDCC / SDIC, Sodium dichloro-s- | antimicrobial | Textile treatment |
| | | Thymol | antimicrobial | |
| | | Sodium bicarbonate | antimicrobial | |
| | | Sodium carbonate | antimicrobial | |
| | | Adipic Acid | antimicrobial | |
| | | Alkyl dimethyl benzyl ammonium chlo | antimicrobial | |
| | | Alkyl dimethyl ethylbenzyl ammonium | antimicrobial | |
| | | Didecyldimethylammonium chloride | antimicrobial | |
| | | Dioctyldimethylammonium chloride | antimicrobial | |
| | | Quaternium-24 | antimicrobial | |
| Glass and Ceramic coating | Organosilane quaternary ammonium compound (e.g., 3- | 3-glycidoxypropylmethyldiethoxysilane; Organofunctional silanes (not | binder/crosslinker/adheasion | Touchscreens |
| | | n-octyltrimethoxysilane | binder/crosslinker/adheasion | Bathrooms |
| | | bis(triethoxysilyl)ethane | binder/crosslinker/adheasion | Partitions |
| | | hexadecyl trimethoxysilane | binder/crosslinker/adheasion | Service Counters |
| Hand Sanitizer | Organosilane quaternary ammonium compound (e.g., 3- | Thymol | antimicrobial | hand sanitizer |
| | | Polyethyloxazoline | binder (non toxic) | |
| | | Poly(2-ethyl-2-oxazoline) like Aquazol | binder (non toxic) | |
| | | Tetrasodium Glutamate Diacetate | chelating agent | |

Table 2A

FIG. 2B

| Composition | 1st Component | 2nd Component | 2nd Component Function | Additional Applications |
|---|---|---|---|---|
| Hard Surface Coating | Organosilane quaternary ammonium compound (e.g. 3-) | Alkylated melamine resin (Modacure) | Resin | Food processing / prep |
| | | Polycarbamide (Evonik IC-168) | Resin | operating room |
| | | Polyvinylidene fluoride or | Resin | service counters |
| | | Polysilazanes | Resin | HVAC |
| | | | | hard surfaces |
| | | | | Floors Antimicrobial |
| | | | | Tanks & Silo coatings/liners |

Table 2B

ANTIMICROBIAL, ANTIVIRAL OR BIOCIDE COATING COMPOSITIONS

FIELD

The present disclosure includes antimicrobial or biocide coatings, coated objects and coating methods.

BACKGROUND

It is desirable to have compositions that can be applied to surfaces and have the capacity to disinfect those surfaces including, for example, disable or kill a wide variety of microbiological organisms, especially potentially harmful microbiological organism, including bacteria, fungi, archaea, protozoa, algae, viruses and other microbiological organisms.

SUMMARY

In one embodiment, an antimicrobial, antiviral or biocide coating composition is provided. The antimicrobial, antiviral or biocide coating composition includes an organosilane quaternary ammonium compound and tetrasodium glutamate diacetate.

In another embodiment, an antimicrobial, antiviral or biocide coating composition is provided. The antimicrobial, antiviral or biocide coating composition includes an organosilane quaternary ammonium compound and sodium dichloro-s-triazinetrione.

In another embodiment, an antimicrobial, antiviral or biocide coating composition is provided. The antimicrobial, antiviral or biocide coating composition includes an organosilane quaternary ammonium compound and thymol.

BRIEF DESCRIPTION OF THE DRAWINGS

The accompanying drawings illustrate presently preferred embodiments of the present disclosure, and together with the general description given above and the detailed description given below, serve to explain the principles of the present disclosure.

FIGS. 1A and 1B is a list of coating composition embodiment optional components; and FIGS. 2A and 2B is a list of exemplary embodiments of the present disclosure.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

The terms "%", "% by weight", "weight %" and "wt %" are all intended to mean unless otherwise stated, percents by weight based upon a total weight of 100% end composition weight. Thus 10% by weight means that the component constitutes 10 wt. parts out of every 100 wt. parts of total composition.

The term "effective amount" of a compound, product, or composition unless otherwise stated, is intended to mean a sufficient amount of the compound, product or composition to provide the desired result. In various embodiments, the effective amount is an antimicrobial amount, which refers to the use of the compounds, products, or compositions and some of the components thereof have antimicrobial activity, along with other ingredients, to create a composition or solution capable of fulfilling its original purpose, based upon the other ingredients, and also of providing antimicrobial, antiviral or biocide protection during the particular application.

The term "antimicrobial" is intended to mean unless otherwise stated an agent, chemical or composition to kill, disable or inactivate microorganisms, such as, for example, bacteria, viruses, fungi, parasites, etc. and other biological predators such as prions.

The term "biocide" is intended to mean unless otherwise stated an agent, chemical or composition intended to destroy, deter, render harmless, or exert a controlling effect on a harmful organism.

Aspects of the present disclosure relate to an antimicrobial or biocide coating compositions, coating systems, coated objects and methods of applying the coating composition or system. One embodiment is a coating composition including a first component and a second component. The first component can provide a persistent antimicrobial or biocide effect (e.g. persistent kill mechanism which physically ruptures the cell membrane of the microorganism) killing, disabling or inactivating those mircoorganisms and can include, as shown in FIGS. 1A and 1B, an organosilane quaternary ammonium compound, for example, an organotrihydroxysilane such as 3-(trihydroxysilyl)propyldimenthyloctadecyl ammonium chloride and those compounds included in U.S. Pat. No. 8,999,363 issued Apr. 7, 2015 the disclosure of which are hereby incorporated by reference in its entirety.

The second component can include one or more of the ingredients listed in FIGS. 1A and 1B. The coating composition can also include optional components including one or more of such ingredients listed in FIGS. 1A and 1B. The second component can include "quick kill" antimicrobials or biocides that kill, disable or inactivate microorganisms they come in contact with within a short length of time, e.g., ten minutes or less. In FIGS. 1A and 1B, 1) The coating formulation I plan on making as ready to use, or durable product. Comprising mainly two components. 2) The process of applying one product/component, then applying the second product/component. 3) Mixing two products, each separate one of the aforementioned components.

The first component (the organosilane quaternary ammonium compound, for example, 3-(trihydroxysilyl)propyldimenthyloctadecyl ammonium chloride) as well as other components included in FIGS. 1A and 1B (e.g., binders and resins) can allow the coating embodiments of the present disclosure to bond with a surface to which the embodiment is applied, such as, for example, glass, ceramic or other hard surfaces such that the coating becomes affixed thereto and retains its antimicrobial, antiviral or biocide effectiveness.

FIGS. 2A and 2B includes exemplary embodiments of the present disclosure including a persistent antimicrobial composition, a glass and/or ceramic coating mixture, a hand sanitizer and a hard surface coating composition, as well as potential uses for each. In FIGS. 2A and 2B, 1) The coating formulation I plan on making as ready to use, or durable product. Comprising mainly two components. 2) The process of applying one product/component, then applying the second product/component. 3) Mixing two products, each separate one of the aforementioned components.

In combining the first and second components, they can be combined in a ratio of first component to second component ranging from about 1: about 100 to about 100: about 1, sufficient to provide an antimicrobial, antiviral or biocide effective amount of the antimicrobial, antiviral or biocide ingredients included therein.

Exemplary application of embodiments of the present disclosure can include The first and second components can be mixed together ahead of application (upon manufacture and prior to sale/delivery to the site where the coating composition is to be applied), immediately or shortly prior to use (subsequent to manufacture and sale/delivery to the site where the coating composition is to be applied and can include immediately prior to application) or during the process of applying the coating resulting from the application of the first and second components of embodiments of the present disclosure.

For the latter, the application process can include applying one of the first and second components followed by applying the other of the first and second components or can include using an application process where both first and second components are applied simultaneously (e.g., using separate supplies (e.g., separate tanks) for each of the first and second components and mixing the two supplies before being applied using a sprayhead applicator or each component emitting from separate spray heads positioned adjacent one another so that the first and second components mix upon exit from their respective spray head during the spray application process). The optional components of the present disclosure if they are present can be included in one or both of the first and second components.

Also, where the first and second components are mixed together ahead of application (upon manufacture and prior to sale/delivery to the site where the coating composition is to be applied), the concentration of the composition so formed can be at a concentration for application of the coating composition or can be at a concentration where the composition can be diluted to reach a concentration for application of the coating composition.

Other exemplary application processes of embodiments of the present disclosure can include, in addition to spraying, included in the paragraph above, submerging, direct application (e.g. pouring, brushing, dipping, flowing, flooding, wiping, physical vapor deposition (PVD) and electrostatic application) with or without spreading of the composition after application (e.g., using a brush, clothe, squeegee, etc.). These methods can be used with the application methods and various compositions of the previous paragraph in place of spraying.

Thus, while there have been shown, described and pointed out, fundamental novel features of the present disclosure as applied to the exemplary embodiments thereof, it will be understood that various omissions and substitutions and changes in the form and details of devices and methods illustrated, and in their operation, may be made by those skilled in the art without departing from the spirit or scope of the present disclosure. Moreover, it is expressly intended that all combinations of those elements and/or method steps, which perform substantially the same function in substantially the same way to achieve the same results, are within the scope of the present disclosure. Moreover, it should be recognized that structures and/or elements and/or method steps shown and/or described in connection with any disclosed form or embodiment of the present disclosure may be incorporated in any other disclosed or described or suggested form or embodiment as a general matter of design choice. It is the intention, therefore, to be limited only as indicated by the scope of the claims appended hereto.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While there have been shown, described and pointed out, fundamental features of the present disclosure as applied to the exemplary embodiments thereof, it will be understood that various omissions and substitutions and changes in the form and details of compositions, devices and methods illustrated, and in their operation, may be made by those skilled in the art without departing from the spirit or scope of the present disclosure. Moreover, it is expressly intended that all combinations of those elements and/or method steps, which perform substantially the same function in substantially the same way to achieve the same results, are within the scope of the present disclosure. Moreover, it should be recognized that structures and/or elements and/or method steps shown and/or described in connection with any disclosed form or embodiment of the present disclosure may be incorporated in any other disclosed or described or suggested form or embodiment as a general matter of design choice. It is the intention, therefore, to be limited only as indicated by the scope of the claims appended hereto.

The invention claimed is:

1. An antimicrobial, antiviral or biocide coating composition, comprising:

i. an organosilane quaternary ammonium compound; and
ii. tetrasodium glutamate diacetate.

2. The antimicrobial, antiviral or biocide coating composition of claim 1, wherein the organosilane quaternary ammonium compound is 3-(trihydroxysilyl)propyldimenthyloctadecyl ammonium chloride.

\* \* \* \* \*